(12) United States Patent
Agrawal et al.

(10) Patent No.: US 10,176,370 B2
(45) Date of Patent: *Jan. 8, 2019

(54) FIELD VERIFICATION OF DOCUMENTS

(71) Applicant: International Business Machines Corporation, Armonk, NY (US)

(72) Inventors: Tushar Agrawal, West Fargo, ND (US); Reinaldo T. Katahira, Jundiai (BR); Craig M. Trim, Sylmar, CA (US); Albert T. Wong, Whittier, CA (US)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/840,541

(22) Filed: Dec. 13, 2017

(65) Prior Publication Data

US 2018/0101727 A1 Apr. 12, 2018

Related U.S. Application Data

(63) Continuation of application No. 14/673,917, filed on Mar. 31, 2015, now Pat. No. 9,934,432.

(51) Int. Cl.
*G06K 9/00* (2006.01)
*G06F 17/24* (2006.01)
*G06F 17/27* (2006.01)

(52) U.S. Cl.
CPC ....... *G06K 9/00469* (2013.01); *G06F 17/243* (2013.01); *G06F 17/2725* (2013.01);
(Continued)

(58) Field of Classification Search
CPC .......... G06K 9/00469; G06K 9/00449; G06K 9/00483; G06F 17/243; G06F 17/2725; G06F 17/248
See application file for complete search history.

(56) References Cited

U.S. PATENT DOCUMENTS 5,848,426 A 12/1998 Wang et al.
7,607,078 B2 10/2009 Geva et al.
(Continued)

FOREIGN PATENT DOCUMENTS

EP 1722704 A1 11/2006

OTHER PUBLICATIONS

IBM Appendix P., "List of IBM Patents or Patent Applications to be Treated as Related", Dated Dec. 13, 2017, 2 pages.
(Continued)

*Primary Examiner* — Vincent Rudolph
*Assistant Examiner* — Pinalben Patel
(74) *Attorney, Agent, or Firm* — Isaac J. Gooshaw

(57) ABSTRACT

A system, method and computer program product to validate documents is provided. A processor receives an image of a document. The processor identifies a plurality of fixed contents of the document. The processor identifies a plurality of field contents of the document. The processor determines a type of the document based, at least in part, on the plurality of fixed contents and the plurality of field contents. The processor validates the plurality of field contents of the document based, at least in part, on rules associated with the type of the document. The processor generates a validated document.

18 Claims, 5 Drawing Sheets

(52) U.S. Cl.
CPC ..... *G06K 9/00449* (2013.01); *G06K 9/00483* (2013.01); *G06F 17/248* (2013.01)

(56) References Cited

U.S. PATENT DOCUMENTS

| | | | |
|---|---|---|---|
| 7,854,013 | B2 | 12/2010 | Dunkley |
| 7,938,590 | B2 | 5/2011 | Supron et al. |
| 8,055,996 | B2 | 11/2011 | Carrier |
| 8,515,816 | B2 | 8/2013 | King et al. |
| 8,526,739 | B2 | 9/2013 | Schmidtler et al. |
| 8,799,763 | B1 | 8/2014 | Singh et al. |
| 9,324,098 | B1 | 4/2016 | Agrawal et al. |
| 2001/0016828 | A1 | 8/2001 | Philippe et al. |
| 2003/0078949 | A1 | 4/2003 | Scholz et al. |
| 2005/0108625 | A1 | 5/2005 | Bhogal et al. |
| 2007/0038924 | A1 | 2/2007 | Beyer et al. |
| 2007/0168382 | A1* | 7/2007 | Tillberg ............ G06F 17/30253 |
| 2009/0006126 | A1 | 1/2009 | Champigny |
| 2009/0063965 | A1 | 3/2009 | Lee |
| 2011/0270826 | A1 | 11/2011 | Cha et al. |
| 2013/0287284 | A1 | 10/2013 | Nepomniachtchi et al. |
| 2013/0304712 | A1 | 11/2013 | Meijer et al. |
| 2016/0292505 | A1* | 10/2016 | Agrawal ............ G06K 9/00469 |

OTHER PUBLICATIONS

Madhani et al., "End-to-End severless, mobile-only based document processing", An IP.com Prior Art Database Technical Disclosure, IP.com No. 000228093, IP.com Electronic Publication: Jun. 5, 2013, Copyright: Intuit Inc.

"Detection and Reaction to Contextual Information based on analysis of a Live Data Stream", An IP.com Prior Art Database Technical Disclosure, Authors et. al.: Disclosed Anonymously, IP.com No. IPCOM000196971D, IP.com Electronic Publication: Jun. 22, 2010, pp. 1-4.

* cited by examiner

FIELD VERIFICATION OF DOCUMENTS

BACKGROUND OF THE INVENTION

The present invention relates generally to the field of document verification, and more particularly to converting and verifying field content of a document.

Many physical documents have fields for a user to input values to initiate a request. The user completes the fields of the document and submits the completed document to another party to initiate a process. While some documents are used for similar purposes, the required contents and location of the fields of each vary drastically. Even documents for similar purposes may require different information or different formatting. Furthermore, with the advent of digitization and transmission of documents, the documents may need additional formatting and validation for proper submittal to a server operated by the other party.

SUMMARY

Embodiments of the present invention provide a method, system, and program product to validate a document. A processor receives an image of a document. The processor identifies a plurality of fixed contents of the document. The processor identifies a plurality of field contents of the document. The processor determines a type of the document based, at least in part, on the plurality of fixed contents and the plurality of field contents. The processor validates the plurality of field contents of the document based, at least in part, on rules associated with the type of the document. The processor generates a validated document.

DETAILED DESCRIPTION

Figure 1:
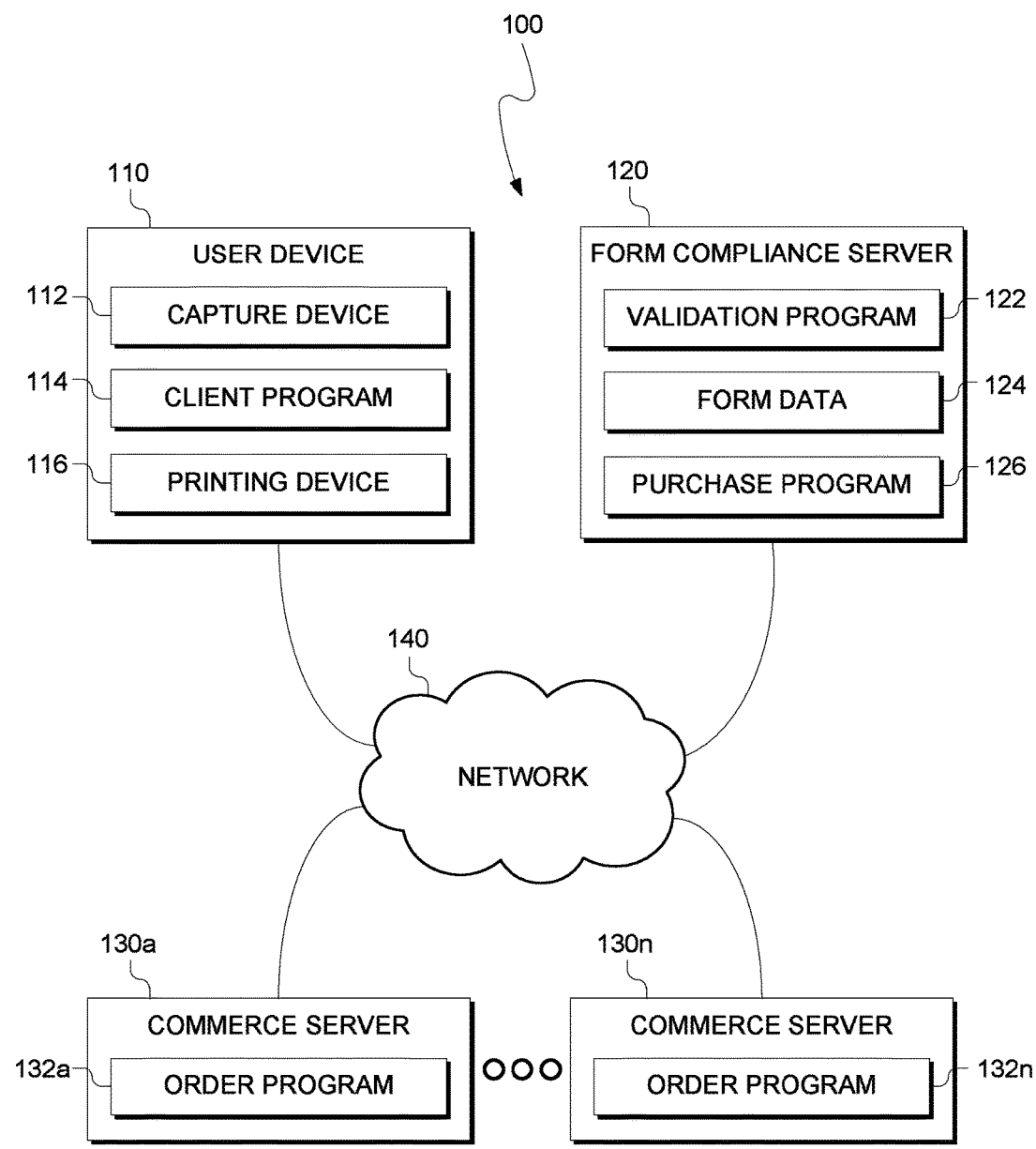
FIG. 1 is a functional block diagram illustrating a document validation environment, in accordance with an exemplary embodiment of the present invention.

While solutions to document validation are known, they do not validate fields of a document based on pre-defined rules. Furthermore, previous solutions do not validate a field based on the values of other fields contained within the document. Embodiments of the present invention recognize that by defining rules that values of fields of a form are considered valid, and validating the data based on said rules, entry and conversion errors of a physical document into an electronic system can be minimized. Also, embodiments of the present invention recognize that by providing a validated document to a user, a user is given greater flexibility in using the validated document when submitted to other users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating document validation environment, generally designated 100, in accordance with one embodiment of the present invention. Document validation environment 100 includes user device 110, form compliance server 120 and commerce servers 130a-n connected over network 140. User device 110 includes capture device 112, client program 114 and printing device 116. Form compliance server 120 includes validation program 122, form data 124 and purchase program 126. Commerce servers 130a-n each include order program 132a-n.

In various embodiments of the present invention, user device 110, form compliance server 120 and commerce servers 130a-n each are a computing device that can be a standalone device, a server, a laptop computer, a tablet computer, a netbook computer, a personal computer (PC), or a desktop computer. In another embodiment, user device 110, form compliance server 120 and commerce servers 130a-n represent a computing system utilizing clustered computers and components to act as a single pool of seamless resources. In general, user device 110, form compliance server 120 and commerce servers 130a-n can each be any computing device or a combination of devices with access to capture device 112, printing device 116 and form data 124 and is capable of executing client program 114, validation program 122, purchase program 126 and order programs 132a-n. User device 110, form compliance server 120 and commerce servers 130a-n may each include internal and external hardware components, as depicted and described in further detail with respect to FIG. 5.

In this exemplary embodiment, client program 114 is stored on user device 110. Validation program 122, form data 124 and purchase program 126 are stored on form compliance server 120. Order programs 132a-n are each stored on a respective commerce server 130a-n. However, in other embodiments, client program 114, validation program 122, form data 124, purchase program 126 and order programs 132a-n may each be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between user device 110, form compliance server 120 and commerce servers 130a-n, in accordance with a desired embodiment of the present invention.

In various embodiments, client program 114 sends an image of a document to validation program 122. The document includes both fixed content and field content. In some embodiments, the document is used to initiate a transaction for a good or service (e.g., a purchase order form, a prescription, or a maintenance request). In general, the document may be any document that a user completes by hand for transcription and validation by validation program 122 (e.g., job applications, government forms, or lease agreements). For purposes of discussion, the discussion of documents is directed towards forms used to initiate a transaction for a good or service. However, one of ordinary skill in the art will appreciate that the embodiments discussed herein may be used to validate and digitize any document with field content completed by a user.

In various embodiments, fixed content include portions of a order form that are present prior to a user completing the form. For example, fixed content includes, but is not limited to, supplier identifying information (e.g., a logo or address of the supplier), form identifying information (e.g., form serial numbers or form titles), or item attribute location information (e.g., column headers for part numbers, quantity or price). In various embodiments, field content includes portions of the order form entered or hand-written by the user or another party (e.g., an optometrist writing a prescription). For example, field content includes, but is not limited to, buyer identifying information (e.g., the buyer's name or address), item order information (e.g., item descriptions, part numbers, and quantities ordered), and transaction identifying information (e.g., payment method, account numbers, or shipping method).

In some embodiments, client program 114 receives input from a user to create an image file of an order form. Capture device 112 is a device used to create an image file of a physical order form provided by the user. Capture device 112 may be any device suitable to create the image file. For example, capture device 112 may be, but not limited to, a scanner, a facsimile machine, a digital camera, or a video camera. In other embodiments, user device 110 does not include a capture device. In other embodiments, client program 114 receives a link to a location of an image file stored locally on user device 110 or on another device (not shown) of network 140. In an embodiment, client program 114 downloads the image file locally to user device 110, given the image file is stored remotely. In another embodiment, client program 114 sends the link to validation program 122 without downloading the image locally to user device 110.

In some embodiments, user device 110 includes a printing device 116. As discussed herein, once validation program 122 transcribes and validates an order form, client program 114 receives the validated order form. Printing device 116 creates a physical copy of the validated order form. Printing device 116 may be any device capable of creating a physical copy. For example, printing device 116 may be, but not limited to, a laser printer or an ink jet printer. In an embodiment, printing device 116 creates a physical copy using a blank piece of paper. Client program 114 sends both the validated fixed and field content to printing device 116 to recreate the entire order form. In other embodiments, printing device 116 creates a physical copy using a blank form, similar to the form captured in the image file. Client program 114 sends the validated field content to the printing device 116 to recreate the entire order form using the pre-existing order form to produce the fixed content.

In various embodiments, client program 114 provides an interface to a user to select and send images of order forms to validation program 122. Validation program 122 receives an image of an order form. Validation program 122 performs image analysis to determine the location and layout of the order form depicted in the received image. Validation program 122 performs optical character recognition, or OCR, to determine the text present in the image of the order form. In addition to recognizing the text of the image file, validation program 122 determines a confidence score for the recognized text. For example, validation program 122 determines a confidence score of "90%" that a character is the number "6", indicating that validation program 122 is ninety percent confident the character is the number six. Furthermore, validation program 122 performs natural language processing, or NLP, to the recognized text to determine the contents of the text. For example, validation program 122 determines that a block of text is a street address based on known arrangements of text (e.g., a street address followed by a city, state and zip code).

In various embodiments, validation program 122 compares the layout and location of the contents of an image file of an order form to one or more known forms in form data 124. Based on a match between the layouts of order form of an image file between a forms in form data 124, validation program 122 selects the matching form and validates the contents of the form based on one or more rules associated with the form in form data 124. Form data 124 includes one or more form templates similar to the fixed content and field content of a physical copy of the form. For example, a form template for prescriptions indicates the location of a physician's name and address is located at the top of the form and centered (e.g., the location of the fixed content). The form template also includes the position the prescription for medicine is located in the center of the document (e.g., the location of the field content). Validation program 122 bases the comparison and matching of form templates and image files on the location of fixed content. Validation program 122 compares the location of fixed content in the image file and selects a form template from form data 124. If more than one match is determined, validation program 122 sends suggested form templates to the user, via client program 114, to select a form from the suggested group of templates.

In various embodiments, once validation program 122 selects a form template, validation program 122 compares the field contents of the image file to valid data fields of the matched template in form data 124. Each template of form data 124 includes rules dictating valid entries for fields in a form. For example, an item number field has a list a valid item numbers that can be ordered via the form. As another example, a field for the optical strength of a lens has a valid range of −1000 to +1000 and can only be in increments of 25. In some embodiments, if a field in the image file is not a valid value, validation program 122 corrects the error. For example, if the OCR of the optical strength is "76" and a confidence score of the '6' character for the field is low, then validation program 122 automatically corrects the character with the low confidence score to a '5', thereby satisfying the rule that optical strengths be in increments of "25". In other embodiments, validation program 122 sends a request to a user, via client program 114, to confirm values that are not valid based on the rules of the matched template. For example, if a character has a high confidence score but does not satisfy a rule, validation program 122 sends a request to a user, via client program 114, to verify to recognized value determined in OCR. In addition, validation program 122 includes in the request a description of the rule indicating why the recognized value is not valid (e.g., "the part number is not offered by the order form").

In various embodiments, templates of form data 124 include rules that validate multiple fields of a given form. A rule is defined that applies to multiple fields that validates one field based on the value of another field. For example, a field for a part number is recognized and is determined to be valid as (e.g., offered for purchase via a supplier on the form). A rule defines that the part associated with the part number is offered only in packages of three. Validation program 122 validates the quantity field to ensure the quantity is a multiple of three. In some embodiments, If the recognized text for the quantity field has a similar confidence score (e.g., both are below 75%) for two different values and one value does not satisfy the multiple field rule (e.g., not a multiple of three), then validation program 122 automatically selects the value that satisfies the rule. In other embodiments, if the recognized text for the quantity field has a high confidence score (e.g., above 95%) for a field, but does not satisfy the multiple field rule, then validation program 122 sends a request to a user, via client program 114, to verify the value.

In various embodiments, validation program 122 creates a digitized order form once all fields have been recognized and validated from an image file of the order form submitted by a user. A digitized order form is an image file with the converted and validated field content contained in the submitted image file. In some embodiments, validation program 122 sends the digitized order form to client program 114. Client program 114 prompts the user for a location (e.g., a memory location of user device 110) or link (e.g., a location of another device connected to network 140) to store the digitized order form. Client program 114 receives input from the user indicating a location or link to store the digitized order form and stores the form to the indicated location or link. In an embodiment, printing device 116 creates a physical copy of the digitized order form. Client program 114 receives input from a user including a link or location to a digitized order form. Client program 114 sends the digitized order form to printing device 116 to create a hard copy of the order form to submit to a supplier to initiate a purchase. Since validation program 122 has ensured the digitized order form is valid, the copy submitted to the supplier is processed and the purchase is initiated while reducing the amount of delay that would otherwise exist.

In some embodiments, client program 114 prompts a user when receiving a digitized order form if the user would like to submit, electronically, the order form to an ecommerce platform of commerce servers 130*a-n*. If the user indicates the form is to be submitted to an ecommerce platform of commerce servers 130*a-n*, then client program 114 sends the digitized order form to purchase program 126. Purchase program 126 includes application programming interfaces (APIs) to interface with order programs 132*a-n* operated by respective suppliers. Order programs 132*a-n* receive incoming orders for products or services provided by a supplier operating the respective commerce server 130*a-n*. Purchase program 126 converts the contents of the digitized order form to a format used by the respective API used by order programs 132*a-n*. In an embodiment, a digitized order form includes supplier identifying information (e.g., a company name). Purchase program 126 automatically sends an electronic purchase order to the respective order program 132*a-n* of the commerce server 130*a-n* operated by the supplier identifying in the digitized order form. In another embodiment, a digitized order form does not include supplier identifying information (e.g., a prescription for contact lenses does not include the supplier). In such embodiments, purchase program 126 sends a request to the user, via client program 114, to provide a supplier to purchase the order form.

Figure 2:
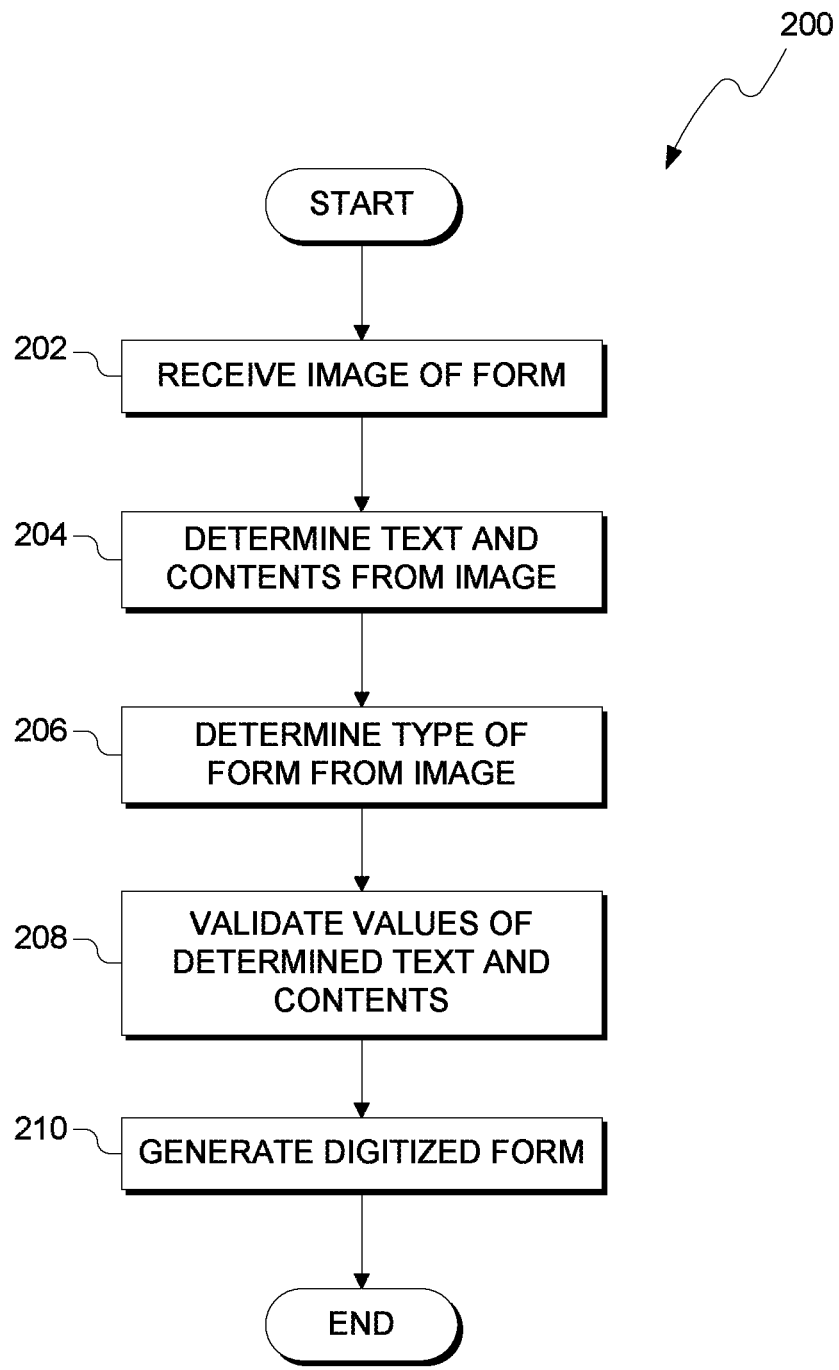
FIG. 2 illustrates operational processes of a validation program, on a computing device within the environment of FIG. 1, in accordance with an exemplary embodiment of the present invention.

FIG. 2 illustrates operational processes, generally designated 200, of validation program 122, executing on form compliance server 120 within the environment of FIG. 1, in accordance with an exemplary embodiment of the present invention.

In process 202, validation program 122 receives an image file of an order form. In some embodiments, client program 114 sends an image capture of a physical form generated by capture device 112. In other embodiments, validation program 122 receives a link or location of an image file stored on a device connected to network 140. In such embodiments, validation program 122 retrieves the image file associated with the link or location provided. In process 204, validation program 122 determines the text and contents of the image file. Validation program 122 performs OCR to the image file to determine the characters and text contained within the image file of the order form. For each character or groups of characters, validation program 122 determines a confidence score for the recognized text. In some embodiments, validation program 122 determines the contents of the form including, but not limited to, images (e.g., logos), tables (e.g., listings of parts being ordered), and other formatting marks (e.g., horizontal bars and other separators). In various embodiments, validation program 122 determines the location of the text and contents within the image file of the order form. In process 206, validation program 122 determines the type of form the received image file represents. As discussed herein and specifically in the discussion of FIG. 3, validation program 122 compares the text and contents, and in some embodiments the location of the text and contents, to one or more forms stored in form data 124. When a matching form is determined by validation program 122, validation program 122 selects the matching form and validates the recognized text and contents based on rules associated with the matched form.

In process 208, validation program 122 validates the contents of recognized text and contents. One or more rules are defined for content of a form (e.g., fixed or filed content) and associated with a form. Based on a form stored in form data 124 matching an image file of a form received by validation program 122, validation program 122 validates the text or contents determined to be in the image file with the one or more rules. The rules associated with forms of form data 124 may be defined to validate of single piece of text or content (e.g., a quantity ordered for a part being in certain multiples of a number). The rules may be defined to validate more than one piece of text or content (e.g., the price of a part must be a certain value). For text or contents that are determined to be valid by a rule, validation program 122 proceeds to any remaining rules. In some embodiments when validation program 122 determines that text or contents not valid, validation program 122 automatically corrects the text or contents. In other embodiments when validation program 122 determines that text or contents not valid, validation program 122 prompts a user for validation of the text or content. In some embodiments, a rule includes the confidence score of a recognized text or portion of text. For example, if text or content is not valid and the recognized text or content has a low confidence score, then validation program 122 automatically selects a value for the text or content to a valid choice for the rule. In another example, if text or content is not valid and the recognized text or content has a high confidence score, then validation program 122 prompts a user for validation of the text or content. In various embodiments, once validation program 122 validates the image file of the form using the rules associated with the form, then validation program 122 generates a digitized form.

In process 210, validation program 122 generates a digitized form of the image file. The digitized form includes the recognized and validated text and contents of the image file of the physical form submitted by a user for validation. In some embodiments, the recognized and validated text is stored in machine readable format (e.g., a font associated with the form). In such embodiments, a user can create a new physical copy (e.g., via printing a copy using printing device 116) that can be easily recognized by a machine or OCR device of a supplier when submitted for a purchase order. In other embodiments, the recognized and validated text is stored in a format used by an ecommerce platform of a supplier associated with the matched order form determined in process 206.

Figure 3:
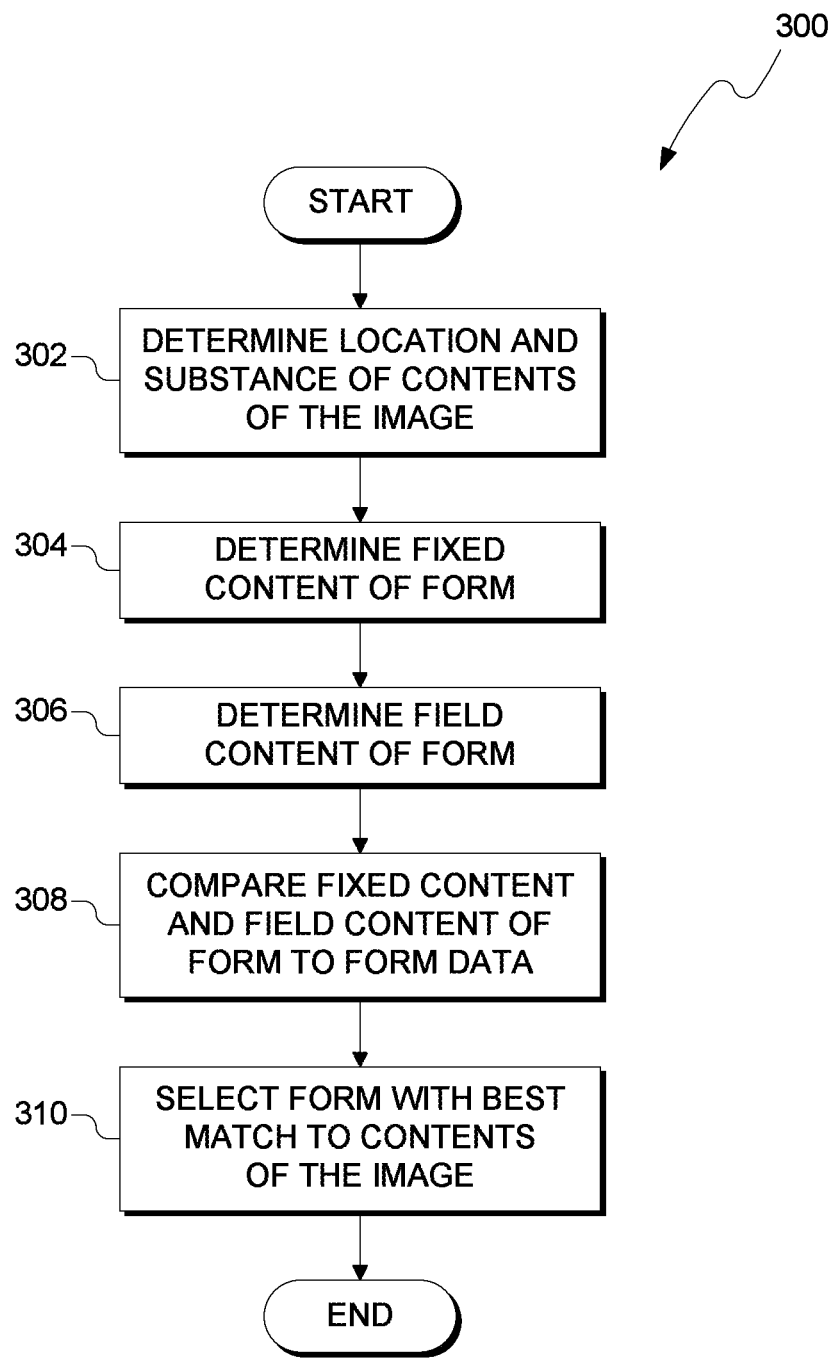
FIG. 3 illustrates operational processes of a validation program for determining a type of form of a capture image, on a computing device within in the environment of FIG. 1, in accordance with an exemplary embodiment of the present invention.

FIG. 3 illustrates operational processes of validation program 122 for determining a type of form of a capture image, generally designated 300, on form compliance server 120 within the environment of FIG. 1, in accordance with an exemplary embodiment of the present invention.

In process 302, validation program 122 determines the location and category of contents for an order form. Validation program 122 determines the position or location of recognized text in the order form. In some embodiments, the position or location is represented using coordinates of the recognized text within the form (e.g., a portion of recognized text is two inches from the top of the form and half an inch from the left side of the form). In other embodiments, the position or location is represented using a relationship to the order form as a whole or other text or contents. For example, the position of the text is represented as being located at the "footer" or "bottom" of the document. As another example, contents of a portion of text is determined to be to the "right" of another portion of recognized text. In some embodiments, validation program 122 determines a category for a type of content of a portion of represents. For example, validation program performs NLP to determine a block of text is an address (e.g., a street name and house number is followed by a city, state abbreviation and a zip code). As a further example, validation program 122 determines the location of text near the address block reads 'Billing Address'. Validation program 122 combines the two pieces of content, due to the close proximity, to represent the billing address of the purchaser.

In process 304, validation program 122 determines the contents of an order form that are fixed content. Fixed content is content that does not vary for separate instances of the order form. For example, fixed content includes a supplier's address or a table for writing down parts to be ordered. Fixed content includes content prior to handwritten order instructions are made by a user or another party (e.g., a doctor writing a prescription). Typically, fixed content is printed in a known font or formatting. In some embodiments, validation program 122 determines that text with high confidence scores (e.g., greater than 99%) is fixed content due to the machine printed nature of the fixed content in a form. In other embodiments, validation program 122 determines recognized text is fixed content based on the location of the text (e.g., forms typically have a fixed address section for a delivery address or column headers for part descriptions and quantities).

In process 306, validation program 122 determines the contents of an order form that are field content. Field content is content that varies for each order and comprises the goods or services requested by the purchaser as well as information relevant to the purchaser (e.g., a debit card account number for billing) and in some instances the supplier (e.g., a department of the supplier meant to fulfill the order). Typically, field content is handwritten or typed using a different apparatus (e.g., a different font or formatting than the fixed portions) than was used to generated the form. In some embodiments, validation program 122 determines field content based on the confidence score for a character or portion of text to be low (e.g., below 75%). Furthermore, if validation program 122 determines multiple recognized characters for a portion of text have similarly low confidence scores, then validation program 122 determines the content to be field content.

In process 308, validation program 122 compares the fixed content and field content to one or more forms stored in form data 124. Validation program 122 determines if the location of field and fixed content matches a form in form data 124. Validation program 122 determines a percentage that the field and fixed content determined from the image file match the locations of field and fixed content of a form in form data 124. In some embodiments, when a category of content is determined, validation program 122 determines a percentage that the categories of field and fixed content determined from the image file match the locations of field and fixed content of a form in form data 124. In an embodiment, validation program 122 changes the classification of fixed content or field content for a portion of content. For example, if a field has a lower confidence score when recognized (e.g., less than 99%) and a form that has a high matching percentage (e.g., greater than 80%), then validation program 122 reclassifies the field content as fixed content given the matching form indicates that the portion of content should be fixed.

In process 310, validation program 122 selects a form from form data 124. Based on the matching percentage determined in process 308 for one or more forms, validation program 122 selects the form with the largest matching percentage. In some embodiments, if multiple forms have similar matching percentages (e.g., Form A has 85%, Form B has 83% and Form C has 78%), then validation program 122 sends a request to the user, via user client 114, to select a form from the multiple forms with similar matching percentages.

Figure 4:
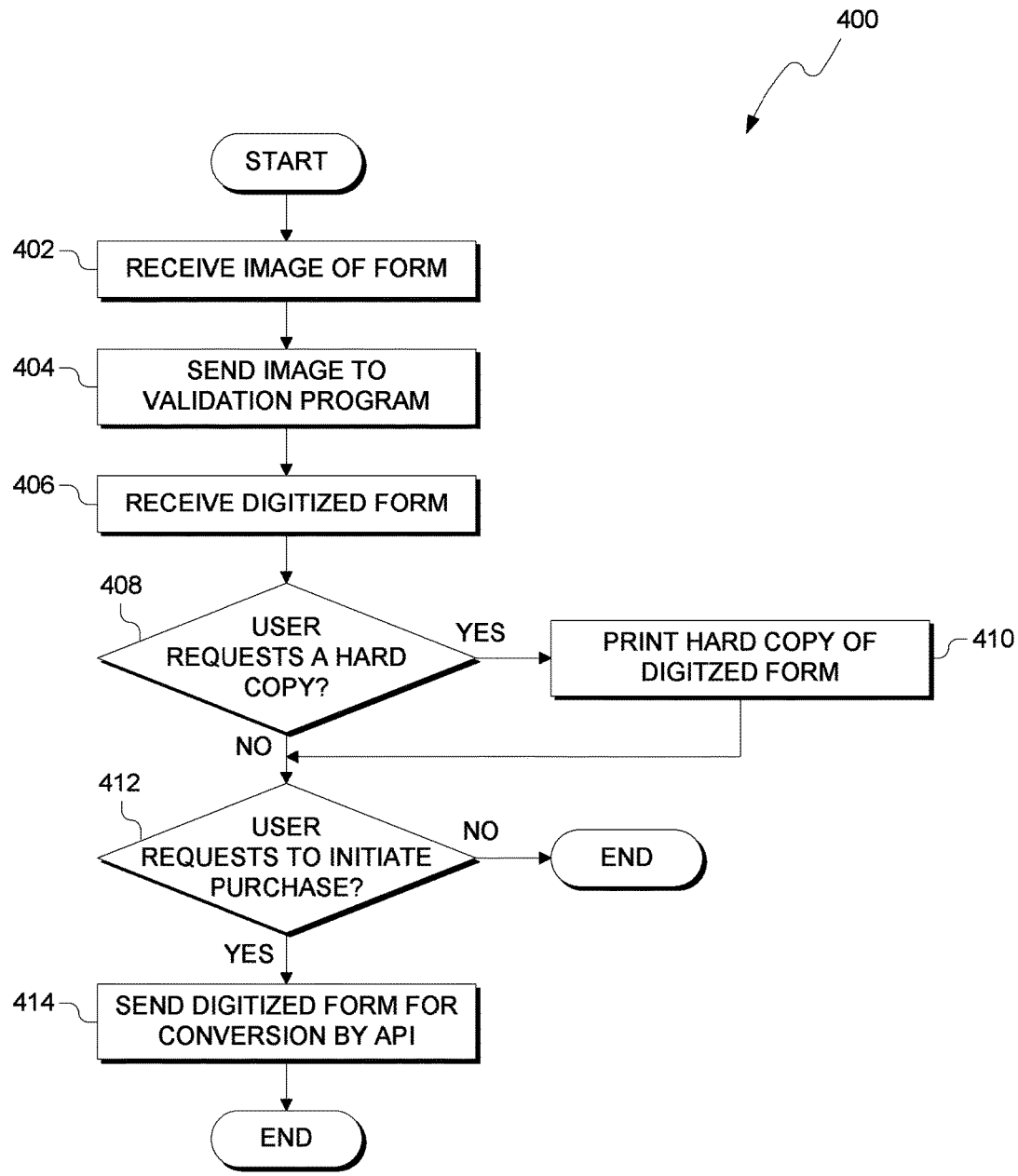
FIG. 4 illustrates operational processes of a client program, on a computing device within the environment of FIG. 1, in accordance with an exemplary embodiment of the present invention.

FIG. 4 illustrates operational processes of client program 114, on user device 110 within the environment of FIG. 1, in accordance with an exemplary embodiment of the present invention.

In process 402, client program 114 receives an image of a form from the user. In some embodiments, capture device 112 generates an image of an order form. In other embodiments, client program 114 receives a link or location of a file containing an image of an order form. Client program 114 downloads the file indicated by the link or location. In process 404, client program 114 sends the image to validation program for validation as discussed herein. In process 406, client program 114 receives a digitized form from validation program 122 which has been validated. The digitized form includes the recognized and validated text and contents of the image file of the physical form submitted by a user for validation.

In process 408, client program 114 prompts the user with a request to create a hard copy of the digitized form. If the user requests a hard copy of the digitized form (YES branch of process 408), then client program 114 sends the digitized order form to printing device 116 (process 410). The hard copy can be kept by the user for a record of the purchase. Similarly, the hard can be used to submit to a seller to initiate a purchase. For example, some order forms do not have a seller explicitly defined on the form (e.g., a prescription for medicine does not have a pharmacy on the order form). If the user does not request a hard copy of the order form (NO branch of process 408), then client program 114 proceeds to process 412.

In process 412, client program prompts the user with a request to initiate an electronic purchase using the digitized order form. If the user does not request an electronic purchase (NO branch of process 412), then client program 114 ends processing. Client program 114 stores the digitized form for later use or retrieval by the user. If the user does request an electronic purchase (YES branch of process 412), then client program 114 sends the digitized form for conversion by purchase program 126 to use an API of the indicated seller on the digitized order form (process 414). Purchase program 126 selects an API used by the respective order program 132a-n of the selected seller operating the respective commerce server 130a-n. In some embodiments, the digitized order form does not indicate a seller. Client program 114 prompts the user to select a seller operating one or more commerce servers 130a-n.

Figure 5:
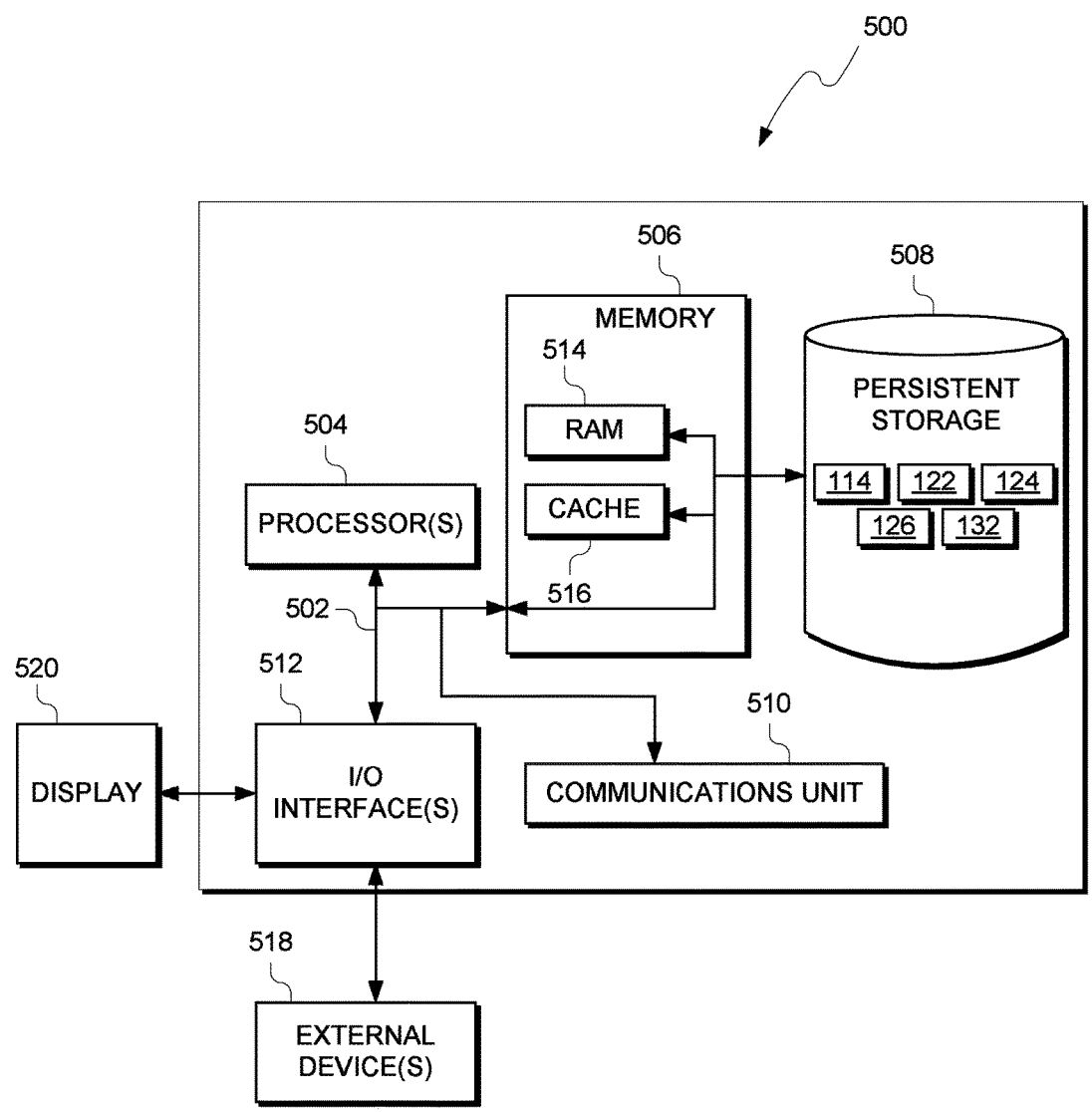
FIG. 5 depicts a block diagram of components of the computing device executing validation program, client program or order program, in accordance with an exemplary embodiment of the present invention.

FIG. 5 depicts a block diagram, 500, of components for each of user device 110, form compliance server 120 and commerce servers 130a-n, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110, form compliance server 120 and commerce servers 130a-n each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Client program 114, validation program 122, form data 124, purchase program 126 and order programs 132a-n are each stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. Client program 114, validation program 122, form data 124, purchase program 126 and order programs 132a-n may be downloaded to persistent storage 508 through communications unit 510.

I/O interface(s) 512 allows for input and output of data with other devices that may be connected to user device 110, form compliance server 120 or commerce servers 130a-n. For example, I/O interface 512 may provide a connection to external devices 518 such as a keyboard, keypad, a touch screen, and/or some other suitable input device. External devices X18 can also include portable computer-readable storage media such as, for example, thumb drives, portable optical or magnetic disks, and memory cards. Software and data used to practice embodiments of the present invention, e.g., client program 114, validation program 122, form data 124, purchase program 126 or order programs 132a-n, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of validating an order form, the method comprising:

receiving, by one or more processors, an image of the order form;

identifying, by the one or more processors, a plurality of fixed contents of the order form, wherein the plurality of fixed contents of the order form includes printed alphanumeric text;

identifying, by the one or more processors, a plurality of field contents of the order form, wherein the plurality of field contents are provided by the user;

determining, by the one or more processors, a type of the order form based, at least in part, on the plurality of fixed contents and the plurality of field contents;

validating, by the one or more processors, a first field content of the plurality of field contents of the order form based, at least in part, on (i) the type of the order form; and (ii) the value of a second field content of the plurality of field contents; and generating, by the one or more processors, a validated order form.

2. The method of claim 1, the method further comprising:

generating, by the one or more processors, a confidence score for a portion of text of a first field content of the plurality of field contents.

3. The method of claim 2, wherein the validation of the first field content of the order form is based, at least in part, on the confidence score for the portion of text of the first field content of the plurality of field contents.

4. The method of claim 1, the method further comprising:

determining, by the one or more processors, a first location of a first fixed content of the plurality of fixed contents within the image of the order form;

determining, by the one or more processors, a second location of a first field content of the plurality of field contents within the image of the order form; and determining, by the one or more processors, the type of the order form based, at least in part on the first location of the first fixed content and the second location of the first field content.

5. The method of claim 1, the method further comprising:

determining, by the one or more processors, a first fixed content of the plurality of fixed contents includes supplier identifying information; and generating, by the one or more processors, an electronic purchase request based, at least in part, on the validated order form and the first fixed content.

6. The method of claim 5, wherein the electronic purchase is generated based, at least in part, on an application programming interface of a supplier indicated by the supplier identifying information.

7. A computer program product for validating an order form, the computer program product comprising:

one or more computer-readable storage media and program instructions stored on the one or more computer-readable storage media, the program instructions comprising:

program instructions to receive an image of the order form;

program instructions to identify a plurality of fixed contents of the order form, wherein the plurality of fixed contents of the order form includes printed alphanumeric text;

program instructions to identify a plurality of field contents of the order form, wherein the plurality of field contents are provided by the user;

program instructions to determine a type of the order form based, at least in part on the plurality of fixed contents and the plurality of field contents;

program instructions to validate a first field content of the plurality of field contents of the order form based, at least in part, on (i) the type of the order form; and (ii) the value of a second field content of the plurality of field contents; and program instructions to generate a validated order form.

8. The computer program product of claim 7, the program instructions further comprising:

program instructions to generate a confidence score for a portion of text of a first field content of the plurality of field contents.

9. The computer program product of claim 8, wherein the validation of the first field content of the order form is based, at least in part, on the confidence score for the portion of text of the first field content of the plurality of field contents.

10. The computer program product of claim 7, the program instructions further comprising:

program instructions to determine a first location of a first fixed content of the plurality of fixed contents within the image of the order form;

program instructions to determine a second location of a first field content of the plurality of field contents within the image of the order form; and program instructions to determine the type of the order form based, at least in part on the first location of the first fixed content and the second location of the first field content.

11. The computer program product of claim 7, the program instructions further comprising:

program instructions to determine a first fixed content of the plurality of fixed contents includes supplier identifying information; and program instructions to generate an electronic purchase request based, at least in part, on the validated order form and the first fixed content.

12. The computer program product of claim 11, wherein the electronic purchase is generated based, at least in part, on an application programming interface of a supplier indicated by the supplier identifying information.

13. A computer system for validating an order form, the computer system comprising:

one or more computer processors;

one or more computer readable storage media; and program instructions stored on the computer readable storage media for execution by at least one of the one or more processors, the program instructions comprising:

program instructions to receive an image of the order form;

program instructions to identify a plurality of fixed contents of the order form, wherein the plurality of fixed contents of the order form includes printed alphanumeric text;

program instructions to identify a plurality of field contents of the order form, wherein the plurality of field contents are provided by the user;

program instructions to determine a type of the order form based, at least in part on the plurality of fixed contents and the plurality of field contents;

program instructions to validate a first field content of the plurality of field contents of the order form based, at least in part, on (i) the type of the order form; and (ii) the value of a second field content of the plurality of field contents; and program instructions to generate a validated order form.

14. The computer system of claim 13, the program instructions further comprising:

program instructions to generate a confidence score for a portion of text of a first field content of the plurality of field contents.

15. The computer system of claim 14, wherein the validation of the first field content of the order form is based, at least in part, on the confidence score for the portion of text of the first field content of the plurality of field contents.

16. The computer system of claim 13, the program instructions further comprising:

program instructions to determine a first location of a first fixed content of the plurality of fixed contents within the image of the order form;

program instructions to determine a second location of a first field content of the plurality of field contents within the image of the order form; and program instructions to determine the type of the order form based, at least in part on the first location of the first fixed content and the second location of the first field content.

17. The computer system of claim 13, the program instructions further comprising:

program instructions to determine a first fixed content of the plurality of fixed contents includes supplier identifying information; and program instructions to generate an electronic purchase request based, at least in part, on the validated order form and the first fixed content.

18. The computer system of claim 17, wherein the electronic purchase is generated based, at least in part, on an application programming interface of a supplier indicated by the supplier identifying information.

* * * * *